United States Patent [19]

Goetz et al.

[11] Patent Number: 5,496,878
[45] Date of Patent: Mar. 5, 1996

[54] THERMOPLASTIC MOLDING MATERIALS BASED ON POLYAMIDES AND CARBOXYL-CONTAINING POLYETHYLENE WAXES

[75] Inventors: Walter Goetz; Walter Betz, both of Ludwigshafen, Germany

[73] Assignee: BASF Aktiengesellschaft, Ludwigshafen, Germany

[21] Appl. No.: 308,991

[22] Filed: Sep. 21, 1994

Related U.S. Application Data

[63] Continuation of Ser. No. 58,355, May 10, 1993, abandoned.

[30] Foreign Application Priority Data

May 15, 1992 [DE] Germany ............................ 42 16 042.1

[51] Int. Cl.⁶ .................................................. C08L 91/06
[52] U.S. Cl. ...................... 524/275; 524/279; 524/442; 524/444; 524/445; 524/447; 524/449; 524/452; 524/493; 524/494; 524/496; 524/500; 524/514; 524/606; 525/66; 525/183
[58] Field of Search .................................. 524/275, 279, 524/500, 514, 606; 525/183, 66

[56] References Cited

U.S. PATENT DOCUMENTS

| | | | |
|---|---|---|---|
| 3,822,227 | 7/1972 | Hermann et al. | 260/28.5 |
| 4,080,349 | 3/1978 | Wurmb et al. | 260/28 |
| 4,181,775 | 1/1980 | Corke | 524/602 X |
| 4,301,050 | 11/1981 | Masuda et al. | 524/602 X |
| 4,537,949 | 8/1985 | Schmidt et al. | 528/335 |
| 4,540,772 | 9/1985 | Pipper et al. | 528/335 |
| 4,873,276 | 10/1989 | Fujii et al. | 524/275 X |
| 4,997,612 | 3/1991 | Gianchandai et al. | 524/275 X |
| 5,155,155 | 10/1992 | Jurlaro | 524/275 |

FOREIGN PATENT DOCUMENTS

| | | |
|---|---|---|
| 054761 | 6/1982 | European Pat. Off. . |
| 164767 | 12/1985 | European Pat. Off. . |
| 2349835 | 4/1975 | Germany . |
| 2348840 | 4/1975 | Germany . |
| 234684 | 4/1986 | Germany . |

*Primary Examiner*—Judy M. Reddick
*Attorney, Agent, or Firm*—Keil & Weinkauf

[57] ABSTRACT

Thermoplastic molding materials are obtainable by mixing

A) from 0.5 to 5% by weight of a carboxyl-containing polyethylene wax having an average molecular weight $M_n$ (number average value) of from 500 to 20,000 and B) from 0 to 50% by weight of fibrous or particulate fillers or mixtures in a melt of C) from 40 to 99.5% by weight of a polyamide prepolymer having a viscosity number of from 40 to 80 ml/g followed by post-condensation in the solid phase.

5 Claims, No Drawings

THERMOPLASTIC MOLDING MATERIALS BASED ON POLYAMIDES AND CARBOXYL-CONTAINING POLYETHYLENE WAXES

This application is a continuation of application Ser. No. 08/058,355 filed on May 10, 1993 now abandoned.

DESCRIPTION

The present invention relates to thermoplastic molding materials obtainable by mixing A) from 0.5 to 5% by weight of a carboxyl-containing polyethylene wax having an average molecular weight $M_n$ (number average value) of from 500 to 20,000 and B) from 0 to 50% by weight of fibrous or particulate fillers or mixtures thereof in a melt of C) from 40 to 99.5% by weight of a polyamide prepolymer having a viscosity number of from 40 to 80 ml/g followed by post-condensation in the solid phase.

The invention also relates to a process for preparing these thermoplastic molding materials, their use for the production of fibers, films and moldings, and also the moldings obtainable thereby.

Polyamides such as Poly-ε-caprolactam and polyhexamethylene adipamide are among engineering plastics that have been known for a long time and are used in many areas. They generally have a good hardness, rigidity and thermal resistance; moreover, they are resistant to abrasion and wear and are also resistant to many chemicals, besides being flame resistant.

In the processing of polyamides, in particular in injection molding, lubricants are generally added to improve the feed performance, flow behavior and demolding behavior.

For example, DE-A 37 06 356 describes polyamide granules having an external lubricant coating of zinc stearate, aluminum stearate and calcium stearate and also $C_2$–$C_{24}$-esters of aliphatic carboxylic acids having 6 to 24 carbon atoms.

The addition of calcium stearate or zinc stearate to polyamide molding materials is known from DE-A 23 49 835.

However, the addition of these lubricants results in a decrease in the molecular weight, combined with a loss of toughness in the processing of polyamides, especially at elevated temperatures. This effect occurs in particular with high melting polyamides such as copolyamides from ε-caprolactam, hexamethylene-diamine and terephthalic acid, and also from tetramethylenediamine and adipic acid. However, these disadvantages are also found with polyamides formed from hexamethylenediamine and adipic acid, especially when aluminum stearate is added. Furthermore, the addition of these lubricants means that the polyamides are no longer flame resistant.

The use of stearic acid, stearyl stearate, pentaerythritol esters, diglycol esters of long-chain fatty acids, palmitic acid, behenic acid and derivatives thereof as lubricants is also known. However, these compounds too exhibit the aforementioned disadvantages.

If these lubricants are worked into a melt of polyamide prepolymers having a viscosity number of from 40 to 80 ml/g and this mixture is subjected to a thermal post-treatment in order to achieve the viscosity numbers of at least 140 ml/g necessary for engineering applications, they are extracted at the prevailing processing temperatures and are thus rendered ineffective.

Polytetrafluoroethylene, molybdenum sulfide and graphite may be mentioned as examples of lubricants not based on derivatives of long-chain fatty acids. However, the disadvantages in this case are in particular the dark intrinsic color and also disadvantages from the economic and health aspects. DD-A 234 684 describes the addition of polyethylene waxes and pigments to polyamides directly before the production of the molded parts.

The addition of small amounts of carboxylated polyethylene waxes to polyamides is known from DE-A 23 48 840.

A mixture of ethylene-carboxylic acid copolymers of low molecular weight and polyamides is described in EP-A 54 761.

However, these preparation processes lead to products that are readily flammable.

It is an object of the present invention to provide thermoplastic molding materials based on polyamide that do not exhibit the aforedescribed disadvantages, and that have in particular a good flowability and flame resistance, even without the addition of special flameproofing agents.

We have found that this object is achieved by the thermoplastic molding materials defined at the beginning.

We have also found a process for preparing these thermoplastic molding materials, their use for the production of fibers, films and moldings, and also the moldings obtainable thereby.

As component A), the thermoplastic molding materials according to the invention comprise from 0.5 to 5% by weight, preferably from 1.5 to 2.5% by weight, of a carboxyl-containing polyethylene wax.

These polyethylene waxes have average molecular weights $M_n$ (number average value) of from 500 to 20,000, preferably from 2,000 to 15,000, and in particular from 5,000 to 10,000, which corresponds to a melt viscosity of from 0.3 to 25, preferably from 0.8 to 15, and in particular from 1 to 10 Pa.s measured in a cone and plate viscometer (at 280° C. and a shear rate of 100 $s^{-1}$).

These carboxyl-containing polyethylene waxes may be copolymers of ethylene with α,β-unsaturated carboxylic acids, for example acrylic acid, or may be polyethylenes onto which carboxyl groups, for example from acrylic acid or maleic anhydride, are grafted. The polyethylenes may be prepared by the high-pressure, medium-pressure or low-pressure processes. High density polyethylenes (HDPE) (in the range of from 0.94 to 0.97 $g/cm^3$), preferably prepared by the Phillips process (medium-pressure process) and also low density polyethylenes (LDPE) (in the range from 0.91 to 0.94 $g/cm^3$), in particular low density linear polyethylenes, preferably prepared by the gas phase process, may be used.

It is also possible to oxidize the polyethylene waxes, for example with ozone, the methyl terminal groups of the polyethylenes preferably being oxidized to carboxyl groups.

The polyethylene waxes used as component A) are known per se or can be prepared by known methods. Suitable products are also commercially available, for example under the trade names Hoechst-Wachs® PED 191 (Hoechst AG), Hoechst-Wachs® H 12 (Hoechst AG), and also Poligen® EAS-1 (BASF Aktiengesellschaft).

As component A) there may also be used mixtures of various carboxyl-containing polyethylene waxes.

As component B) the thermoplastic molding materials according to the invention may comprise conventional additives and processing auxiliaries such as stabilizers, oxidation retardants, agents to prevent thermal decomposition and decomposition by ultra-violet light, mold release agents, colorants such as dyes and pigments, fibrous and pulverulent fillers and reinforcing agents, nucleation agents, plasticizers, etc., in an amount of generally not more than 50% by weight.

Examples of oxidation retardants and heat stabilizers that may be mentioned include halides of metals of Group I of the Periodic Table, for example sodium, potassium and/or lithium halides, if desired in combination with copper(I) halides, for example chlorides, bromides, iodides, sterically hindered phenols, hydroquinones, aromatic secondary amines such as diphenylamines, various substituted members of these groups and their mixtures in concentrations of up to 1% by weight, based on the weight of the thermoplastic molding material.

UV stabilizers that may be mentioned, and which are generally used in amounts of up to 2% by weight based on the molding material, are various substituted resorcinols, salicylates, benzotriazoles and benzophenones.

Furthermore, organic dyes such as nigrosin, pigments such as titanium dioxide, cadmium sulfide, cadmium selenide, phthalocyanines, Ultramarine Blue and carbon black, and also fibrous and pulverulent fillers and reinforcing agents, may be added. Examples of the latter include carbon fibers, glass fibers, amorphous silica, asbestos, calcium silicate (wollastonite), aluminum silicate, magnesium carbonate, kaolin, chalk, powdered quartz, mica and feldspar. The proportion of such fillers and dyes is in general up to 50% by weight, preferably from 20 to 35% by weight.

Nucleation agents that may be added include, for example, talcum, calcium fluoride, sodium phenyl phosphinate, aluminum oxide and finely particulate polytetrafluoroethylene.

Examples of plasticizers that may be mentioned include dioctyl phthalate, dibenzyl phthalate, butyl benzyl phthalate, hydrocarbon oils, N-(n-butyl)benzenesulfon-amide and o- and p-tolylethylsulfonamide.

In order to improve the flame resistance still further, all known flameproofing agents for polyamides may be added, in particular those based on phosphorus compounds and red phosphorus itself.

As component C), the thermoplastic molding materials according to the invention comprise from 40 to 99.5% by weight, preferably from 92 to 99% by weight, and in particular from 97.5 to 98.5% by weight, of a polyamide prepolymer having a viscosity number of from 40 to 80 ml/g, preferably from 45 to 60 ml/g, measured in a 0.5% by weight solution in concentrated sulfuric acid at 23° C.

Polyamides that may be used for the preparation of the component C) include thermoplastic partly crystalline polyamides.

Suitable polyamides may be prepared for example by condensation of equimolar amounts of a saturated dicarboxylic acid having 4 to 12 carbon atoms with a diamine having 4 to 14 carbon atoms by condensation of ω-aminocarboxylic acids or by polyaddition of lactams.

Examples of polyamides include polyhexamethyleneadipamide, polyhexamethyleneazelamide, polyhexamethylenesebacamide, polyhexamethylene- dodecanediamide, polytetramethyleneadip-amide, and the polyamides obtained by ring opening of lactams, such as polycaprolactam and polylauric acid lactam.

These partly crystalline polyamides are generally linear.

Particularly preferred are polytetramethylene- adipamide, polyhexamethyleneadipamide, polyhexamethylenesebacamide and polycaprolactam, and also copolyamides of terephthalic acid, hexamethylene-diamine and ε-caprolactam or of terephthalic acid, isophthalic acid, if desired adipic acid and hexamethylenediamine comprising more than 50% by weight of terephthalic acid/hexamethylenediamine units; polyhexamethyleneadipamide and polycaprolactam are particularly specially preferred. However, mixtures of different polyamides may also be used.

The preparation of the polyamide prepolymers having a viscosity number of from 40 to 80 ml/g (component C) may be carried out according to the processes described in EP-A 129 195 and 129 196.

According to these processes an aqueous solution of the monomers is heated to a temperature of from 250° to 300° C. under elevated pressure and with the simultaneous evaporation of water and the formation of a prepolymer, prepolymer and steam are then continuously separated, the steam is rectified, and the entrained diamines are recycled. Finally, the prepolymer is passed to a polycondensation zone and polycondensed under a superatmospheric pressure of from 1 to 10 bar and a temperature of from 250° to 300° C. In this process it is essential that the aqueous salt solution be heated under an excess pressure of from 1 to 10 bar within a residence time of less than 60 seconds, the degree of conversion at the outlet from the evaporation zone advantageously being at least 93% and the water content of the prepolymer being at most 7%.

The formation of triamines is largely prevented by these short residence times.

The aqueous solutions used generally have a monomer content from 30 to 70% by weight, in particular from 40 to 65% by weight.

The aqueous salt solution is continuously passed, advantageously a temperature of from 50° to 100° C., into an evaporation zone, where the aqueous salt solution is heated under an excess pressure of from 1 to 10 bar, preferably from 2 to 6 bar, at a temperature of from 250° to 330° C. It is understood of course that the temperature employed is above the melting point of the polyamide to be prepared in each case.

As already mentioned, it is essential that the residence time in the evaporation zone be at most 60 seconds, preferably from 10 to 55 seconds, and in particular from 10 to 40 seconds.

The conversion at the outlet from the evaporation zone is at least 93%, preferably from 95 to 98%, and the water content is preferably in the range from 2 to 5% by weight, in particular from 1 to 3% by weight.

The evaporation zone is advantageously in the form of a tube bundle. Particularly suitable are tube bundles in which the cross section of the individual tubes is comprises a periodically recurring sequence of tubes and gaps.

Furthermore, it has proved advantageous to pass the mixture of prepolymer and steam, immediately after the evaporation zone and before the separation of the phases, through a tubular mass transfer zone provided with internal fittings. The temperatures and pressure conditions employed in the evaporation zone are maintained in the mass transfer zone. The internal fittings, for example packings such as Raschig rings, metal rings or, in particular,wire net packings, give rise to a large surface area. The phases, i.e. the prepolymer and steam, are thereby brought into intimate contact. The effect of this is that the amount of diamine released with the steam is considerably reduced. In general a residence time of from 1 to 15 minutes is maintained in the mass transfer zone. The mass transfer zone is advantageously formed as a tube bundle.

The two-phase mixture of steam and prepolymer leaving the evaporation zone and mass transfer zone is separated. The separation generally takes place by itself on account of the physical differences in a vessel, the lower part of the vessel advantageously being formed as a polymerization zone. The vapors that are released essentially comprise steam and diamines that were released in the evaporation of the water. These vapors are passed to a column and rectified. Suitable columns are for example packed columns, bubble-cap columns or sieve-plate columns with 5 to 15 theoretical plates. The column is conveniently operated under the same pressure conditions as the evaporation zone. The diamines contained in the vapors are thereby separated and returned to the evaporation zone. It is also possible to add the diamines to the following polymerization zone. The rectified steam that is obtained is removed from the head of the column.

The prepolymer obtained, which corresponding to its degree of conversion essentially comprises low molecular weight polyamide and possibly residual amounts of unreacted salts, is passed into a polymerization zone. In the polymerization zone the resultant melt is polycondensed at a temperature of from 250° to 330° C., in particular from 270° to 310° C., and under an excess pressure of from 1 to 10 bar, in particular from 2 to 6 bar. The vapors that are thereby released, together with the aforementioned vapors, are advantageously rectified in the column, a residence time of from 5 to 30 minutes preferably being maintained in the polycondensation zone. The polyamide prepolymer obtained, which generally has a viscosity number of from 40 to 80 ml/g, preferably from 45 to 60 ml/g, measured in a 0.5% by weight solution in 96% sulfuric acid at 23° C., is continuously removed from the condensation zone.

According to a preferred operating procedure, the polyamide prepolymer thus obtained is passed in molten form through a discharge zone, with simultaneous removal of the residual water contained in the melt. Suitable discharge zones are for example vented extruders. The melt freed from the water in this way is then cast into strands and granulated. The granules obtained (component C) are melted at about 20° C. above the melting point of the component C) (in the case of polyhexamethyleneadipamide at about 280° C.), preferably in a twin-screw extruder, and mixed with the carboxyl-containing polyethylene wax (component A) and if desired the component B), discharged as strands, cooled, and granulated.

In a particularly preferred embodiment it is also possible to add the component A) and if desired the component B) to the vented extruder, and in this case the vented extruder is normally equipped with suitable mixing elements such as kneaders. The material is then likewise extruded as strands, cooled and granulated.

These granules are condensed in the solid phase under an inert gas continuously or discontinuously at a temperature below the melting point, e.g. from 170° to 240° C., until the desired viscosity is obtained. Tumbling dryers for example may be used for discontinuous solid phase condensation and tubes traversed by a hot inert gas may be used for continuous solid phase condensation. Continuous solid phase condensation is preferred, nitrogen or, in particular, superheated steam, preferably the steam occurring at the head of the column, being used as inert gas.

The viscosity number, measured in a 0.5% by weight solution in 96% sulfuric acid at 23° C., is generally in the range from 120 to 500 ml/g, preferably from 130 to 200 ml/g, after the post-condensation in the solid phase.

The thermoplastic molding materials according to the invention have, overall, a balanced property spectrum, in particular a good flowability and flame resistance. They are suitable for producing fibers, films and moldings.

EXAMPLES

Components A

A1: An oxidized low density polyethylene (LDPE), terminal group-carboxylated with about 4 to 5 COOH groups per molecule and having a molecular weight $\bar{M}_n$ (number average) of about 15,000 (Hoechst-Wachs® PED 191 der Hoechst AG). PED 191 from Hoechst AG).

A2: A terminal group-carboxylated, high density polyethylene (HDPE) having an average molecular weight $\bar{M}_n$ of about 5,000.

A3: A copolymer comprising 93% by weight of ethylene and 7% by weight of acrylic acid having a molecular weight $\bar{M}_n$ of 12,000 (Poligen® EAS-1 der BASF Aktiengesellschaft). EAS-1 from BASF Aktiengesellschaft).

Component C

A polyamide prepolymer, prepared according to the process described in EP-A-129 195, 669.6 kg of an equimolar adipic acid/hexamethylenediamine salt being dissolved at 80° C. in 330.4 kg of water and continuously polycondensed in a tube bundle reactor with a throughput corresponding to a polyamide amount of 50 kg/hour at a temperature of 283° C. and at a pressure of 2.8 bar. The product had a viscosity number of 58 ml/g, measured in a 0.5% by weight solution in concentrated sulfuric acid at 23° C.

EXAMPLES 1 TO 5

The polyamide prepolymer (component C) was introduced as a melt by means of a discharge screw from the separating vessel of the polycondensation apparatus into a twin-screw extruder (ZSK 53 from Werner & Pfleiderer) and mixed with the various components A at 280° C. and 120 r.p.m. The melt was then degassed by applying a reduced pressure, virtually no post-condensation occurring. The product was discharged as strands, cooled, granulated, and post-condensed with superheated steam at a temperature of 182° C. and a residence time of 11 hours. The viscosity number, measured in a 0.5% by weight solution in concentrated sulfuric acid at 23° C., was 140 ml/g.

Comparative Examples V1 to V4

The procedure described in Examples 1 to 5 was adopted, except that carboxyl-containing polyethylene waxes having molecular weights $\bar{M}_n$ of more than 20,000 were used as component A).

AV1: A copolymer of 90% by weight of ethylene and 10% by weight of acrylic acid having a molecular weight $\bar{M}_n$ of 45,000 (Lucalen® H 6920 der BASF Aktiengesellschaft). H 6920 from BASF Aktiengesellschaft).

AV2: A copolymer of 92.7% by weight of ethylene and 7.3% by weight of acrylic acid having a molecular weight $\bar{M}_n$ of 190,000 (Lucalen® A 3710 der BASF Aktiengesellschaft). A 3710 from BASF Aktiengesellschaft).

The polyamide (component C*) was mixed as granules with the component A1 (V7) and with aluminum tristearate (Alugel® from Bärlocher, Munich) (V8) in a twin-screw extruder (ZSK 53 from Werner & Pfleiderer) at a temperature of 280° C., 25 discharged as strands, cooled and granulated.

The modulus of elasticity of the products was determined according to DIN 54 457, the tensile strength according to DIN 54 455 and the melt flow index (MFI) according to DIN 53 735 (at 285° C. and 5 kg load). The penetration energy Wges was measured at a test temperature of 23° C. according to DIN 53 443 on 2 mm thick roundels of diameter 60 mm, that had been injection molded at 280° C. The quickest possible cycle time was determined at 280° C. on a test tool (vacuum cleaner cover). The fire test was performed according to UL94 (ANSI) on rectangular test pieces of thicknesses 0.8 mm/1.6 mm/3.2 mm.

The compositions and properties are summarized in the Table.

TABLE

| Example | Composition | [% by weight] | Modulus of elasticity [kJ/m$^2$] | Tensile strength [kJ/m$^2$] | Wges [J/m] | Fire test | Cycle time [sec] | MFI [g/10 min] |
|---|---|---|---|---|---|---|---|---|
| 1 | 1.0 A1 | 99.0 C. | 3050 | 87 | 100 | V2/V—/V— | 30 | 140 |
| 2 | 2.0 A1 | 98.0 C. | 2950 | 84 | 120 | V2/V2/V2 | 23 | 150 |
| 3 | 4.0 A1 | 96.0 C. | 2900 | 81 | 120 | V2/V2/V2 | 22 | 166 |
| 4 | 2.0 A2 | 98.0 C. | 2980 | 83 | 118 | V2/V2/V2 | 24 | 155 |
| 5 | 2.0 A3 | 98.0 C. | 3000 | 84 | 120 | V2/V2/V2 | 23 | 165 |
| V1 | 2.0 AV1 | 98.0 C. | 2980 | 85 | 130 | V2/V2/V— | 33 | 135 |
| V2 | 2.0 AV2 | 98.0 C. | 3020 | 85 | 140 | V2/V2/V— | 38 | 120 |
| V3 | 2.0 AV3 | 98.0 C. | 2900 | 82 | 140 | V—/V—/V— | 46 | 98 |
| V4 | 2.0 AV4 | 98.0 C. | 2895 | 81 | 140 | V—/V—/V— | 44 | 101 |
| V5 | 0.7 aluminum tristearate | 99.3 C. | 3010 | 86 | 30 | V—/V—/V— | 44 | 105 |
| V6 | — | 100.0 C. | 3025 | 85 | 102 | V2/V2/V2 | 40 | 109 |
| V7 | 2.0 A1 | 98.0 C.* | 2940 | 85 | 90 | V—/V—/V— | 24 | 140 |
| V8 | 0.7 aluminum tristearate | 99.3 C.* | 3025 | 86 | 38 | V2/V2/V2 | 28 | 160 |

AV3: A copolymer of 60% by weight of ethylene, 35% by weight of n-butyl acrylate and 5% by weight of acrylic acid having a melt flow index MFI of 10.5 g/10 min (at 190° C. and 2.16 kg load), $\bar{M}_n$ of 120,000.

AV4: An ethylene-propylene rubber having a weight ratio of ethylene to propylene of 45:55, grafted with 0.8% by weight of maleic anhydride having a melt flow index MFI of 150 g/10 min (at 230° C. and 2.16 kg load), $\bar{M}_n$ of 150,000 (Exxelor® 1803 der Exxon Chemical). 1803 from Exxon Chemical).

Comparative Example V5

The procedure described in Examples 1 to 5 was adopted, except that aluminum tristearate (Alugel® from Bärlocher, Munich) was incorporated as component A).

Comparative Example V6

The procedure described in Examples 1 to 5 was adopted, but without a component A).

Comparative Examples V7 and V8

Component C*

A polyamide comprising units derived from hexamethylenediamine and adipic acid and having a viscosity number of 145 ml/g (measured in a 0.5% by weight solution in concentrated sulfuric acid at 23° C.) (Ultramid® A3 from BASF Aktiengesellschaft).

We claim:

1. A process for preparing a thermoplastic molding composition which consists essentially of mixing
   A) from 0.5 to 5% by weight based on the total composition of a carboxyl-containing polyethylene wax having an average molecular weight $\bar{M}_n$ (number average value) from 500 to 20,000 and
   B) from 0 to 50% by weight based on the total composition of fibrous or particulate fillers or mixtures thereof in a melt of
   C) from 40 to 99.5% by weight based on the total composition of a polyamide prepolymer having a viscosity number of from 40 to 80 ml/g (measured in a 0.5% by weight solution in 96% sulfuric acid at 23° C.) followed by post-condensation in the solid phase and wherein the ingredients employed in the process consist essentially of A), B) and C).

2. A process as defined in claim 1, wherein the polyamide has a viscosity number of at least 120 ml/g after the post condensation in the solid phase (measured in a 0.5% by weight solution in 96% sulfuric acid at 23° C.).

3. A thermoplastic molding material prepared according to the process of claim 1.

4. A thermoplastic molding material prepared according to the process of claim 2.

5. The process of claim 1 wherein the polyethylene has a molecular weight of from 5,000 to 10,000.

* * * * *